United States Patent
Mitchell et al.

(10) Patent No.: US 7,883,737 B2
(45) Date of Patent: Feb. 8, 2011

(54) METHODS ALLOWING FOR VISUAL INSPECTION OF COATED COMPONENTS FOR EROSION DAMAGE

(75) Inventors: Stephen Craig Mitchell, West Chester, OH (US); Andrew J. Brizgis, Cincinnati, OH (US); Donald George LaChapelle, Cincinnati, OH (US); Warren Rosal Ronk, West Chester, OH (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 12/057,845

(22) Filed: Mar. 28, 2008

(65) Prior Publication Data
US 2009/0238983 A1    Sep. 24, 2009

Related U.S. Application Data

(60) Provisional application No. 61/037,524, filed on Mar. 18, 2008.

(51) Int. Cl.
*B32B 43/00*    (2006.01)
*B32B 9/04*    (2006.01)

(52) U.S. Cl. ............................ 427/9; 427/409; 427/410

(58) Field of Classification Search ................ 427/402, 427/419.1, 419.2, 9, 409, 410
See application file for complete search history.

(56) References Cited

U.S. PATENT DOCUMENTS

| | | | | |
|---|---|---|---|---|
| 3,640,778 A * | 2/1972 | Winfree et al. | ............ | 148/277 |
| 5,253,472 A * | 10/1993 | Dev | ............ | 60/791 |
| 5,486,096 A * | 1/1996 | Hertel et al. | ............ | 416/224 |
| 6,861,154 B2 | 3/2005 | Olson | | |
| 7,334,330 B2 * | 2/2008 | Vance | ............ | 29/889.2 |
| 2005/0241148 A1 * | 11/2005 | Vance | ............ | 29/889.2 |
| 2005/0273126 A1 | 12/2005 | Beaupre | | |
| 2007/0044704 A1 | 3/2007 | Osborne | | |
| 2007/0231156 A1 * | 10/2007 | Hong | ............ | 416/241 R |

FOREIGN PATENT DOCUMENTS

| | | |
|---|---|---|
| FR | 2793445 A1 | 11/2000 |
| GB | 2322099 A | 8/1998 |
| JP | 2004270484 A | 9/2004 |
| WO | 9600842 A1 | 1/1996 |

OTHER PUBLICATIONS

PCT/US2009/035391, Search Report and Written Opinion, Feb. 26, 2010.
PCT/US2009/035399, Search Report and Written Opinion, Feb. 26, 2010.
PCT/US2009/035426, Search Report and Written Opinion, Feb. 26, 2010.
Asakura, D., "Corrosion/Wear Resistant Coating for Steam Turbine Member and Method of Forming the Coating," abstract, Thomson Scientific, London, Great Britain.

* cited by examiner

*Primary Examiner*—William Phillip Fletcher, III
(74) *Attorney, Agent, or Firm*—Marcella Louke

(57) ABSTRACT

Methods allowing for visual inspection of a coated component for erosion damage involving providing a component, and applying a plurality of layers of an erosion system to at least a portion of the component to produce the coated component where each layer of the erosion system comprises a different color that becomes visible as the layer is eroded.

11 Claims, 3 Drawing Sheets

METHODS ALLOWING FOR VISUAL INSPECTION OF COATED COMPONENTS FOR EROSION DAMAGE

CROSS REFERENCE TO RELATED APPLICATIONS

This application claims priority to Provisional Application Ser. No. 61/037,524, filed Mar. 18, 2008, which is herein incorporated by reference in its entirety.

TECHNICAL FIELD

Embodiments described herein generally relate to methods allowing for visual inspection of a coated component for erosion damage. More particularly, embodiments herein generally describe methods comprising providing a component having a plurality of layers of an erosion system wherein each layer of the erosion system comprises a different color that becomes visible as the layer is eroded.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine, which in turn spins the shaft and provides power to the compressor. The hot exhaust gases are further expanded through nozzles at the back of the engine, generating powerful thrust, which drives the aircraft forward.

In recent years composite materials have become increasingly popular for use in a variety of aerospace applications because of their durability and relative lightweight. Because engines operate in a variety of conditions, engine components often come into contact with foreign objects, such as hailstones, ice, sand, and dirt. Over time, contact with such foreign objects can damage and erode the surface of the composite engine components.

To help protect the composite components from exposure to such harsh environments, the surface of the component is often coated with external, secondarily applied materials. By "secondarily applied" it is meant that the composite component is cured prior to the application of the coating. These secondarily applied materials may include polymer coatings that are sprayed, painted, or otherwise bonded to the composite component. Other secondarily applied materials may include metal foils or sheets that are preformed and bonded to the composite component. In general, this approach can require considerable labor and expense for preparation and processing, typically requiring sanding and/or priming of the cured composite component prior to the application of the coating.

In addition, to ensure that the finished component satisfies dimensional constraints, each component must be inspected after the protective coating is applied. For example, non-destructive evaluation techniques, such as the use of a coordinate-measuring machine, a hand gauge, or ultrasonic inspection, can be used to determine if defects are present. If it is determined that there is significant coating thickness variation, which there often is, the coating must be stripped and reapplied. Even if the dimensions are found to be accurate, additional labor is often needed to ensure the desired bond integrity and surface finish are achieved.

When it is discovered that a coated surface needs to be repaired, the depth of the eroded portion can be measured to determine the extent of the wear. If the depth of erosion is small, the surface may be locally sanded, prepped, and recoated by spraying or painting a new coating onto the eroded surface. If the depth of erosion is large, entire sections of the composite component may be removed and replaced with patches of material attached using epoxy or other suitable matrix material.

Accordingly, there remains a need for methods allowing for visual inspection of coated components for erosion damage.

BRIEF DESCRIPTION OF THE INVENTION

Embodiments herein generally relate to methods allowing for visual inspection of a coated component for erosion damage comprising providing a component, and applying a plurality of layers of an erosion system to at least a portion of the component to produce the coated component wherein each layer of the erosion system comprises a different color that becomes visible as the layer is eroded.

Embodiments herein also generally relate to methods allowing for visual inspection of a coated component for erosion damage comprising providing a component, and applying a plurality of layers of an erosion system to at least a portion of the component to produce the coated component wherein the erosion system comprises a support having a color and the support of each layer of the erosion system comprises a different color that becomes visible as the layer is eroded.

Embodiments herein also generally relate to methods allowing for visual inspection of a coated turbine engine component for erosion damage comprising providing a turbine engine component having a surface, and applying a first layer of an erosion system to at least a portion of the surface of the turbine engine component, and applying at least a second layer of an erosion system to the first layer of the erosion system to produce the coated component wherein each of the first layer and the second layer of the erosion system comprises a different color that becomes visible as the layer is eroded.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to methods allowing for visual inspection of a coated component for erosion damage. The erosion systems, components comprising the same, and methods for making the same described herein may generally include a component and at least one layer of an erosion coating system. Also described are improved methods of inspection for articles comprising the erosion coating system.

Figure 1:
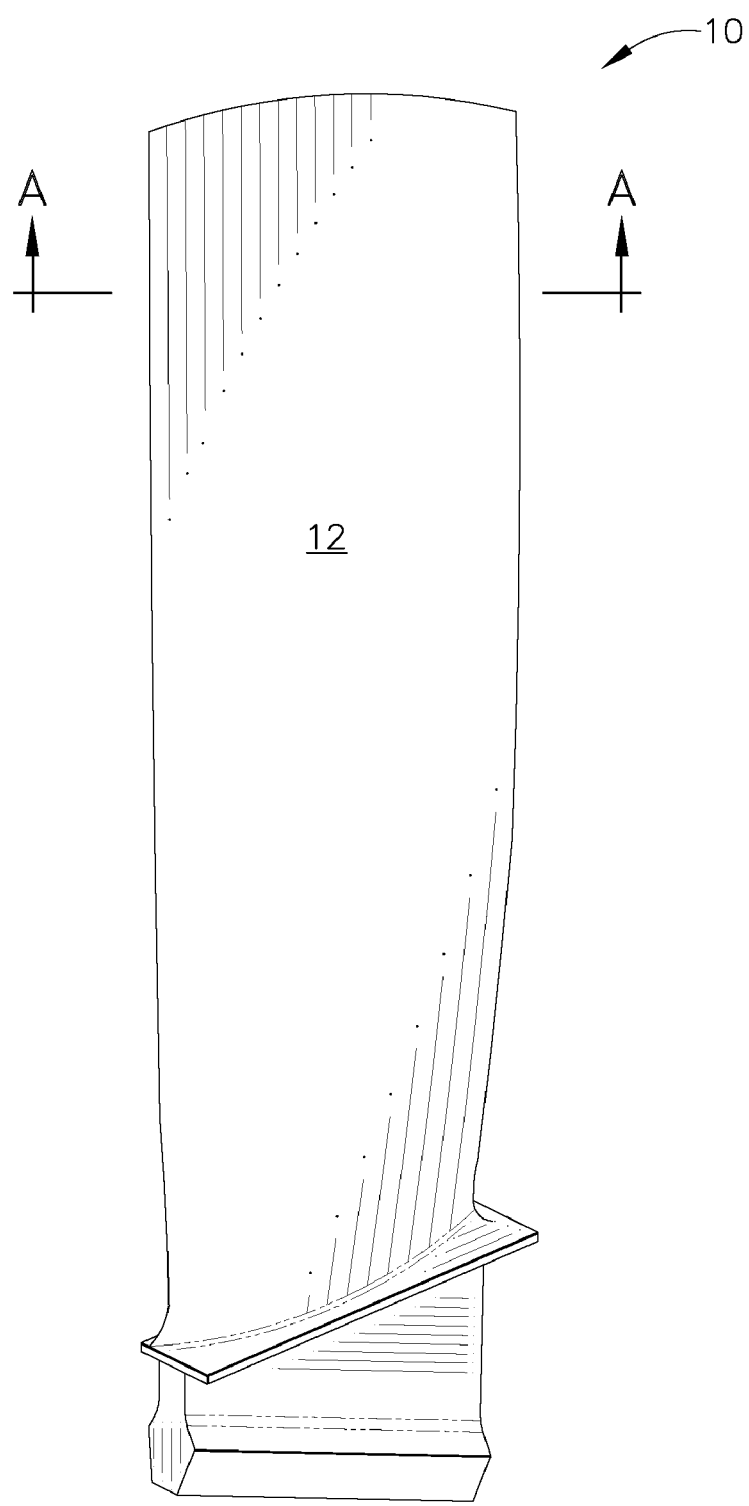
FIG. 1 is a schematic perspective view of one embodiment of a component in accordance with the description herein.

Referring to FIG. 1, as used herein, "component" 10 may be used to refer to any suitable part, which in one embodiment may be a turbine engine part having at least one surface 12 capable of being coated as described herein. Component 10 may generally comprise a composite, or a combination of a composite and a metal, such as titanium or titanium alloy. For purposes of illustration, component 10 will be shown and discussed as a guide vane comprising both a metal and a composite, though the embodiments herein should not be limited to such.

Figure 2:
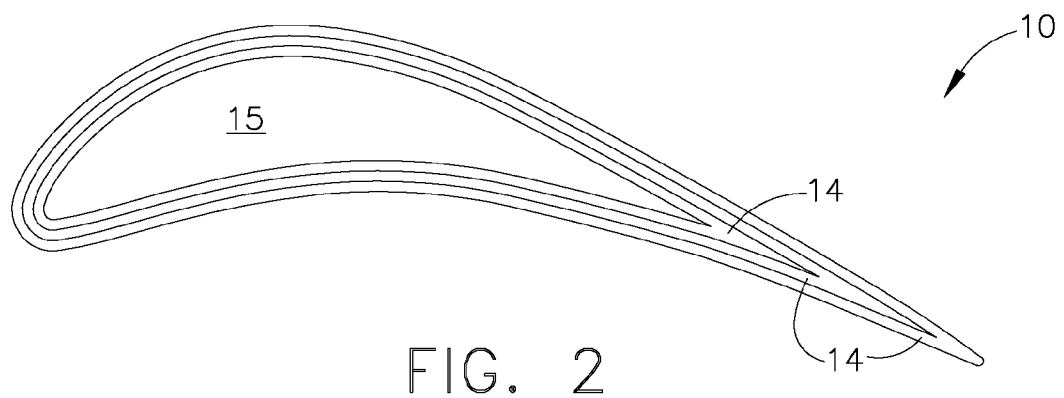
FIG. 2 is a schematic cross-sectional view of the component of FIG. 1 taken at line A-A in accordance with the description herein.

For example, in one embodiment, component 10 may comprise a composite made from a material including organic or non-organic fibers, and a resin matrix. More particularly, as used herein, "material" can refer to any woven, braided, or non-crimp fabric or fibers capable of being treated and cured with a resin to produce a composite. In one embodiment, the material may comprise carbon fibers, graphite fibers, glass fibers, ceramic fibers, aramid polymer fibers (e.g. Kevlar®), and combinations thereof. As shown in FIG. 2 and as will be understood by those skilled in the art, component 10 may comprise a plurality of layers of a material 14, and that each of such layers may comprise the same, or different, weaves, braids, and/or fiber composition. If component 10 comprises a composite and a metal, material 14 can be laid up using conventional fabrication techniques to achieve the desired shape such as wrapping the plurality of layers of material 14 about a metal spar 15 that will become part of the finished coated component. Resin infusion can be carried out at a later point in the process as described herein below.

Component 10 may take any shape desired to carry out its intended purpose. By way of example, some acceptable turbine engine components suitable for use herein may include, but should not be limited to, vanes, blades, struts, ducts, spacers, and the like. Those skilled in the art will understand that although the examples provided herein relate to turbine engines, "component" may be used to refer to any part matching the previous description.

Figure 3:
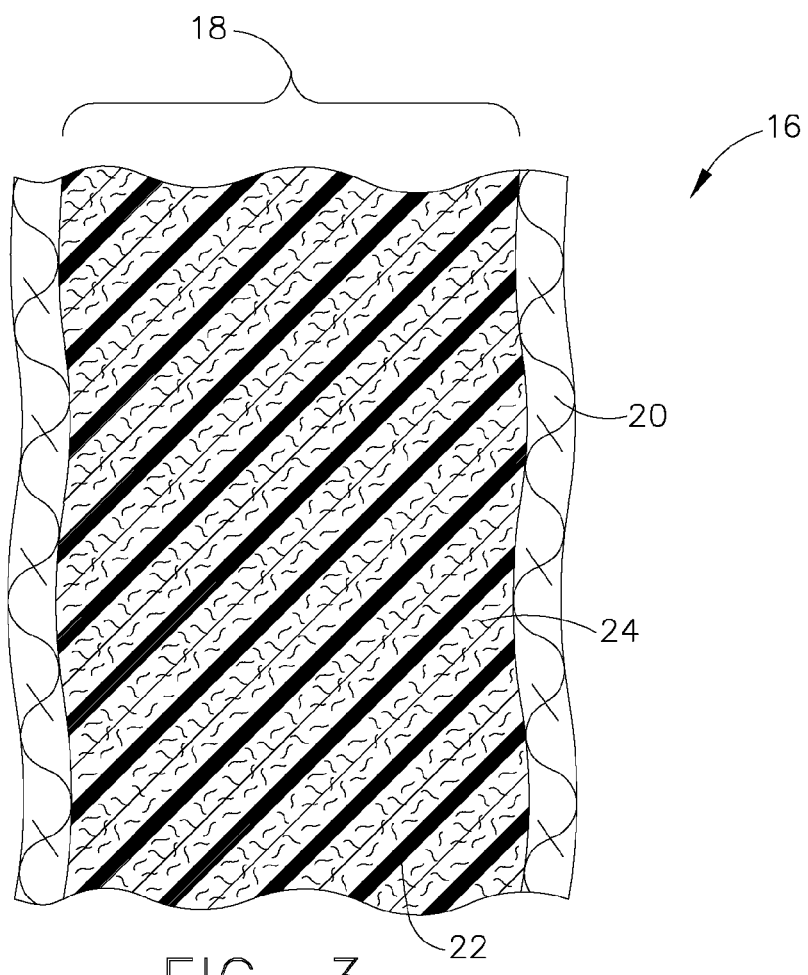
FIG. 3 is a schematic view of a portion of one embodiment of an erosion system showing both the support and the toughened resin in accordance with the description herein.

As shown in FIG. 3, an erosion system 16 can then be prepared for later application to the component. As used herein, "erosion system" refers to a layered coating comprising a toughened resin 18 applied to a support 20, as defined herein below.

Erosion system 16 can utilize a resin 22 to serve as a composite matrix. Resin 22 can comprise any conventional liquid resin known to those skilled in the art, such as, but not limited to, epoxy resin, bismaleimide resin, or polyimide resin. A toughening agent 24 can then be added to resin 22 to produce toughened resin 18 that can provide erosion resistance upon curing. Some examples of toughening agents 24 can include, but should not be limited to, fibers, nano fibers, nano particulates, and combinations thereof. Some examples of possible fibers can include carbon fibers, graphite fibers, glass fibers, ceramic fibers, aramid polymer fibers, and combinations thereof. While the amount of toughening agent 24 added to resin 22 can vary depending on the final toughness desired after curing, in general, toughened resin 18 can comprise from about 0.1% to about 25%, by weight, of toughening agent 24.

Figure 4:
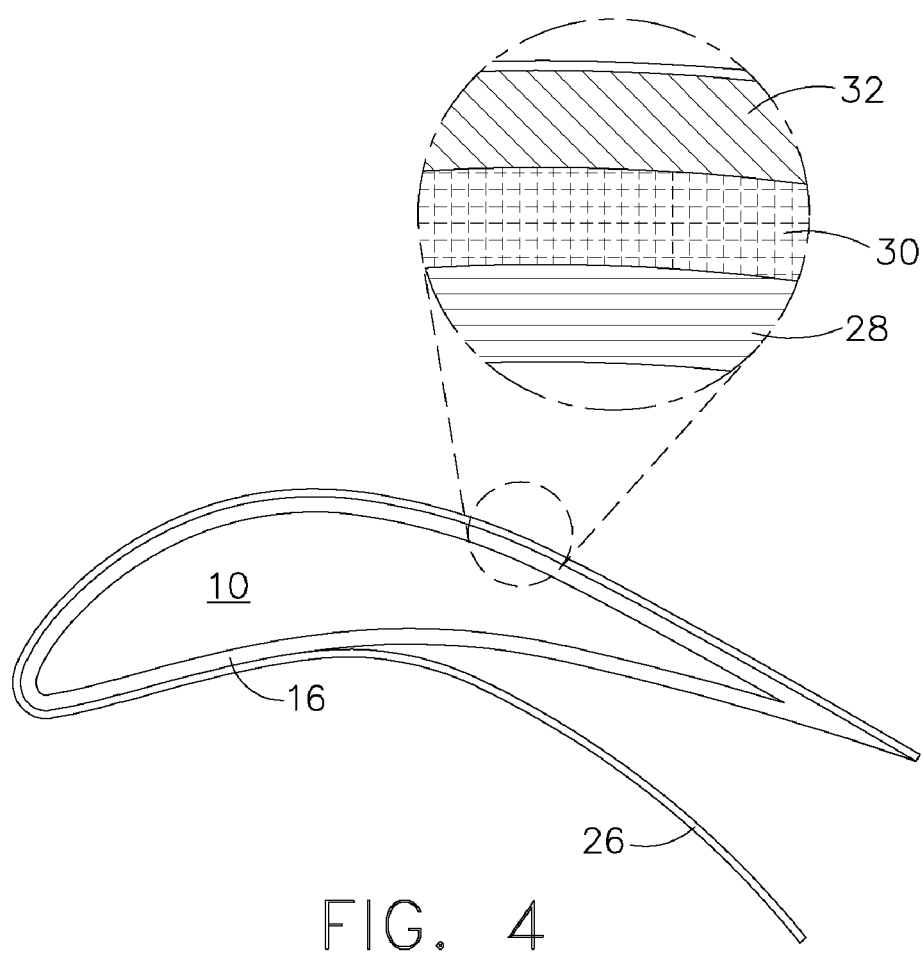
FIG. 4 is a schematic cross-sectional view of the component of FIG. 1 having a plurality of layers of an erosion system applied thereto in accordance with the description herein.

As shown in FIG. 3, toughened resin 18 may be applied to support 20. As used herein, "support" refers to any mesh, netting, webbing, or other suitable structure to which toughened resin 18 can be applied. Support 20 can comprise, but should not be limited to, carbon fibers, graphite fibers, glass fibers, ceramic fibers, aramid polymer fibers, and combinations thereof. Those skilled in the art will understand that while the dimensions of support 20 can vary, the fibers of the support should be capable of retaining the applied toughened resin 18. Erosion system 16 can then be applied to at least a portion of surface 12 of component 10 by wrapping, for example, as shown in FIG. 4. The tackiness of the toughened resin present in the erosion system can help secure erosion system 16 in place for further processing.

For ease of transfer and handling, in one embodiment, erosion system 16 can be applied with the aid of a backing 26 on the side opposed to the component, as shown in FIG. 4. Once the layer of erosion system 16 is applied, backing 26 can be peeled away. This process can be repeated for the application of additional layers of erosion system 16 if desired.

Moreover, if a plurality of layers of erosion system 16 is desired, in one embodiment, each layer may comprise the same combination of the toughened resin and the support. Alternately, in another embodiment, each layer can comprise a support having a different color. The colored layers can be stacked to reveal different depths of penetration as erosion occurs. For example, if the erosion system has three layers, a first layer 28, a second layer 30, and a third layer 32, first layer 28 can comprise support 20 that is blue in color, second layer 30 can comprise support 20 that is yellow in color, and third layer 32 can comprise support 20 that is green in color. These colors can serve and as indicator of the degree of erosion present on a component. The colors of the support can be achieved by a variety of methods, including, but not limited to, constructing the support from fibers of different colors.

Figure 5:
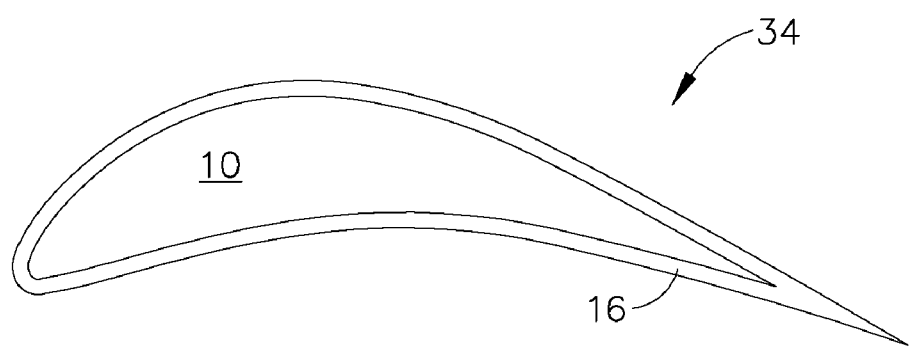
FIG. 5 is a schematic cross-sectional view of one embodiment of a coated component in accordance with the description herein.

Once the desired layers of erosion system 16 have been applied, component 10 comprising erosion system 16 can be co-molded using conventional techniques known to those skilled in the art, for example, compression molding, resin transfer molding, vacuum assisted resin transfer molding, or autoclaving. As used herein, "co-molding" refers to infusing resin into both the component and the layers of the erosion system concurrently. Component 10 comprising erosion system 16 can be cured concurrently using standard curing conditions known to those skilled in the art. The result is a coated component 34 wherein erosion system 16 remains as a composite film at the outermost layer, thereby providing coated component 34 with protection from the elements, as shown generally in FIG. 5. Those skilled in the art will understand that the previously described methods for making an applying the erosion system are equally applicable if the component comprises a metal, or a combination of a composite and metal.

The previously described coating system offers several benefits over current coatings including superior erosion protection, visual identification of the coated component for maintenance issues, and the ability to co-mold.

The erosion system described herein can provide from about a 50% increase to about a 400% increase in erosion resistance to the underlying component per layer of the erosion system utilized when compared to conventional erosion protection mechanisms. This increase in erosion resistance can be measured as the mass loss of coating corresponding to a given flux of abrasive material, such as sand. Once cured, the incorporation of the previously described toughening agents into the liquid resin can allow the erosion system to serve as an integral barrier between the outside elements and the coated composite. Without intending to be limited by theory, the addition of the fibers to the resin makes the toughened resin a composite film after curing. This composite film is better able to withstand erosion attributable to elemental exposure.

Moreover the inclusion of a plurality of layers of the erosion system, each having a different colored support, can provide for visual identification of erosion. As the erosion system erodes from exposure to the elements, different colored layers of the support are revealed. By visually inspecting the colors of the exposed mesh, it can be determined how deep into the erosion system the erosion has penetrated. This visual inspection can increase the efficiency of making assessments of the integrity of the erosion system for purposes of maintenance or repair, as compared to conventional techniques.

In addition, the ability to co-mold the present embodiments can provide net shaped coated components displaying more dimensional consistency and less variation between coated components. In this way, the sanding, priming, and painting steps generally required by conventional manufacturing can be substantially eliminated. Co-molding can also help reduce the cost and time involved in manufacturing such coated components. In addition, a variety of erosion resistance improvements can be achieved in a single component by applying a different number of layers of material to the component, by selectively positioning the placement of the material about the component, or a combination thereof. Moreover, the ability to selectively improve erosion in specific portions of the component can further help save costs by eliminating the need to coat the entire component.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method allowing for visual inspection of a coated component for erosion damage comprising:
    providing a metal component; and
    wrapping a plurality of layers of an erosion system to at least a portion of the component to produce the coated component, each layer of the erosion system comprising:
        a toughened resin applied to a support
wherein the metal comprises titanium, a titanium alloy, or a combination thereof and wherein the support of each layer of the erosion system comprises a different color that becomes visible as the layer is eroded.

2. The method of claim 1 wherein the erosion system comprises a support having a color and the support of each layer of the erosion system comprises a different color.

3. The method of claim 2 wherein the support comprises a structure selected from the group consisting of mesh, netting, webbing, and combinations thereof.

4. The method of claim 2 wherein the support is comprises fibers selected from the group consisting of carbon fibers, graphite fibers, glass fibers, ceramic fibers, aramid polymer fibers, and combinations thereof.

5. The method of claim 1 comprising wrapping the plurality of layers of the erosion system to a turbine engine component selected from the group consisting of vanes, blades, struts, ducts, and spacers.

6. A method allowing for visual inspection of a coated component for erosion damage comprising:
    providing a metal component; and
    wrapping a plurality of layers of an erosion system to at least a portion of the component to produce the coated component, each layer of the erosion system comprises:
        a resin selected from the group consisting of epoxy, bismaleimide, polyimide, and combinations thereof, combined with;
        a toughening agent selected from the group consisting of carbon fibers, graphite fibers, glass fibers, ceramic fibers, aramid polymer fibers, and combinations thereof, to produce a toughened resin that is applied to a support
wherein the metal comprises titanium, a titanium alloy, or a combination thereof and wherein the support of each layer of the erosion system comprises a different color that becomes visible as the layer is eroded.

7. The method of claim 6 wherein the support comprises a structure selected from the group consisting of mesh, netting, webbing, and combinations thereof.

8. The method of claim 7 wherein the support is comprises fibers selected from the group consisting of carbon fibers, graphite fibers, glass fibers, ceramic fibers, aramid polymer fibers, and combinations thereof.

9. The method of claim 8 comprising wrapping the plurality of layers of the erosion system to a turbine engine component selected from the group consisting of vanes, blades, struts, ducts, and spacers.

10. A method allowing for visual inspection of a coated turbine engine component for erosion damage comprising:
    providing a metal turbine engine component having a surface;
    wrapping a first layer of an erosion system to at least a portion of the surface of the turbine engine component; and
    wrapping at least a second layer of an erosion system to the first layer of the erosion system to produce the coated component
wherein the metal comprises titanium, a titanium alloy, or a combination thereof and wherein each of the first layer and the second layer of the erosion system comprises a toughened resin applied to a support of a different color that becomes visible as the layer is eroded.

11. The method of claim 10 comprising wrapping the plurality of layers of the erosion system to a turbine engine component selected from the group consisting of vanes, blades, struts, ducts, and spacers.

* * * * *